United States Patent
Lim et al.

(10) Patent No.: US 8,655,387 B2
(45) Date of Patent: Feb. 18, 2014

(54) METHOD AND APPARATUS OF LOCATION MEASUREMENT USING THE LOCATION OF NEIGHBOR UE

(75) Inventors: Jaewon Lim, Gyeonggi-do (KR); Byounghoon Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 36 days.

(21) Appl. No.: 13/421,806

(22) Filed: Mar. 15, 2012

(65) Prior Publication Data
US 2012/0244884 A1 Sep. 27, 2012

Related U.S. Application Data

(60) Provisional application No. 61/467,393, filed on Mar. 25, 2011.

(51) Int. Cl.
*H04W 24/00* (2009.01)

(52) U.S. Cl.
USPC .............. 455/456.6; 455/456.1; 455/456.2; 455/404.2

(58) Field of Classification Search
USPC .......... 455/404.1, 404.2, 414.1, 456.1, 456.2, 455/456.3, 456.5, 456.6, 420, 433, 435.1
See application file for complete search history.

(56) References Cited

U.S. PATENT DOCUMENTS

| 7,653,352 | B2 * | 1/2010 | Murphy ..................... 455/41.2 |
| 8,347,360 | B2 * | 1/2013 | Schultz et al. .................... 726/4 |
| 2008/0108319 | A1 * | 5/2008 | Gallagher .................. 455/404.2 |
| 2008/0263151 | A1 * | 10/2008 | Doi et al. ...................... 709/203 |
| 2010/0056175 | A1 * | 3/2010 | Bachmann et al. ........ 455/456.1 |
| 2010/0222082 | A1 * | 9/2010 | Ishii ............................ 455/456.5 |
| 2011/0229132 | A1 * | 9/2011 | Matsumoto .................... 398/48 |
| 2012/0009944 | A1 * | 1/2012 | Wang et al. ............... 455/456.3 |
| 2012/0015665 | A1 * | 1/2012 | Farley et al. .............. 455/456.1 |

* cited by examiner

*Primary Examiner* — Jean Gelin
(74) *Attorney, Agent, or Firm* — Lee, Hong, Degerman, Kang & Waimey (57) ABSTRACT

According to an embodiment of the present disclosure, there is provided a method of allowing a mobile terminal to measure its own location. The measurement method may include receiving a temporary identifier from a neighbor terminal using near field wireless communication; transmitting a location information request to a base station using the temporary identifier when location information is required; and receiving location information from the base station. The location information may be measured by the neighbor terminal.

13 Claims, 4 Drawing Sheets

METHOD AND APPARATUS OF LOCATION MEASUREMENT USING THE LOCATION OF NEIGHBOR UE

CROSS-REFERENCE TO RELATED APPLICATIONS

Pursuant to 35 U.S.C. §119(e), this application claims the benefit of U.S. Provisional Application No. 61/467,393 filed on Mar. 25, 2011, the contents of which are hereby incorporated by reference herein in its entirety.

BACKGROUND OF THE INVENTION

1. Field of the invention

The present disclosure relates to a mobile terminal, and more particularly, to the location measurement of a mobile terminal.

2. Description of the related art

In recent years, location measurement technologies for checking the location of a mobile terminal in real time have been widely used, and there are provided various location-based services on the basis of the technologies. In order to provide a location-based service, the process of measuring a current location of the terminal should be carried out in advance.

In general, technologies for measuring the location of a mobile terminal may include a GPS-based scheme and a mobile communication system-based scheme.

For the GPS-based scheme, a GPS receiver is incorporated in a mobile terminal to compute a distance between a GPS satellite and the GPS receiver, thereby obtaining a coordinate value thereof.

The mobile communication system-based scheme may include a Time Of Arrival (TOA) measurement method, a Time Difference Of Arrival (TDOA) measurement method, an Angle Of Arrival (AOA) measurement method, and the like.

For the TOA method, a time of radio wave arrival between a mobile terminal and a base station may be measured to measure the location of the mobile terminal.

For the TDOA method, the location of a mobile terminal may be determined by using a time difference between signals transmitted from different places. A radio wave time difference in proportion to a distance difference from two base stations to a mobile terminal may be measured, and the mobile terminal may be located on a position having a constant distance difference from the two base stations, namely, on a hyperbolic curve with foci at the two base stations. Two hyperbolic curves are obtained from three base stations, and an intersection point between the two hyperbolic curves may become the location of the mobile terminal.

For the AOA method, furthermore, the direction of a signal being arrived from a mobile terminal may be measured at two base stations to obtain an angle of direction, and the location of the mobile terminal may be measured by using the angle of direction.

However, for the location measurement method using a GPS receiver, a GPS receiver should be incorporated in a user equipment, and thus its serviceable devices are limited and the location measurement is difficult in a region incapable of receiving satellite signals. Further, it has a drawback that the power consumption of a mobile terminal is large when driving a GPS receiver.

Meanwhile, an estimation method, using a time difference, a receiving direction or an angle of radio wave arrival, has a drawback that the accuracy of location estimation is low due to a path difference in the environment of many multi-paths.

SUMMARY OF THE INVENTION

Accordingly, in order to solve the foregoing problem, according to the present disclosure, there is defined a method of measuring the location of a specific terminal at a place where the relevant terminal is located, and allowing the relevant location information to be shared with a neighbor terminal to enable the neighbor terminal to know its own location without directly performing location measurement.

Furthermore, the process of directly transmitting the location information of the relevant terminal to a neighbor terminal may likely provide unreliable location information, and thus there is also defined a method of issuing and using a temporary ID for sharing location information through a base station.

In order to accomplish the foregoing objective, according to an embodiment of the present disclosure, there is disclosed a method of allowing a mobile terminal to measure its own location. The measurement method may include receiving a temporary identifier from a neighbor terminal using near field wireless communication; transmitting a location information request to a base station using the temporary identifier when location information is required; and receiving location information from the base station. The location information may be measured by the neighbor terminal.

The reception of a temporary identifier using near field wireless communication may use an active RFID scheme.

The reception of a temporary identifier using near field wireless communication may use either one of a Bluetooth scheme and a Zigbee scheme. Here, the reception of a temporary identifier may be implemented through a beacon message transmitted from the neighbor terminal. Otherwise, the reception of a temporary identifier may be implemented by accessing the neighbor terminal at a preset time to receive a message containing the temporary identifier.

The method may further include examining an effective time of the temporary identifier prior to transmitting the location information request to a base station, wherein the effective time is received together with a temporary identifier of the neighbor terminal.

The method may further include receiving a temporary identifier from the base station; transmitting the received temporary identifier to a neighbor terminal using near field wireless communication; and transmitting a temporary identifier of the neighbor terminal received from the neighbor terminal to the base station.

The process of receiving a temporary identifier from the base station may be implemented by determining a specific time. Otherwise, the process of receiving a temporary identifier from the base station may be implemented when the mobile terminal initially accesses the base station.

A time for transmitting a temporary identifier to a neighbor terminal may be concurrently received by using a specific near field wireless communication scheme when receiving the temporary identifier from the base station.

The temporary identifier may be received from the base station after the neighbor terminal transmits its own location information to the base station.

According to another embodiment of the present disclosure, there is provided a mobile terminal for measuring its own location using the location information of a neighbor terminal. The mobile terminal may include a wireless communication unit; and a controller configured to control the wireless communication unit to transmit and/or receive a temporary identifier to and/or from a neighbor terminal, request the location information of the neighbor terminal having the temporary identifier to a base station, and receive the location information of the neighbor terminal from the base station. The transmission and reception of the temporary identifier may be implemented through near field wireless communication. The near field wireless communication may be any one of an active RFID scheme, a Bluetooth scheme, and a Zigbee scheme.

The present invention may have an effect of reducing the power consumption of a mobile terminal compared to location measurement with a GPS scheme. Furthermore, location information may be obtained even in a region incapable of receiving GPS signals, and thus location information acquisition corresponding to a GPS scheme may be allowed even when the mobile terminal is not mounted with a GPS receiver.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the concept of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Furthermore, a suffix "module" or "unit" used for constituent elements disclosed in the following description is merely intended for easy description of the specification, and the suffix itself does not give any special meaning or function.

Furthermore, the terms including an ordinal number such as first, second, etc. used herein can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, the embodiments disclosed herein will be described in detail with reference to the accompanying drawings, and the same or similar elements are designated with the same numeral references regardless of the numerals in the drawings and their redundant description will be omitted.

In describing the embodiments disclosed herein, moreover, the detailed description will be omitted when a specific description for publicly known technologies to which the invention pertains is judged to obscure the gist of the present invention. Also, it should be noted that the accompanying drawings are merely illustrated to easily explain the concept of the invention, and therefore, they should not be construed to limit the technological concept disclosed herein by the accompanying drawings.

Figure 1:
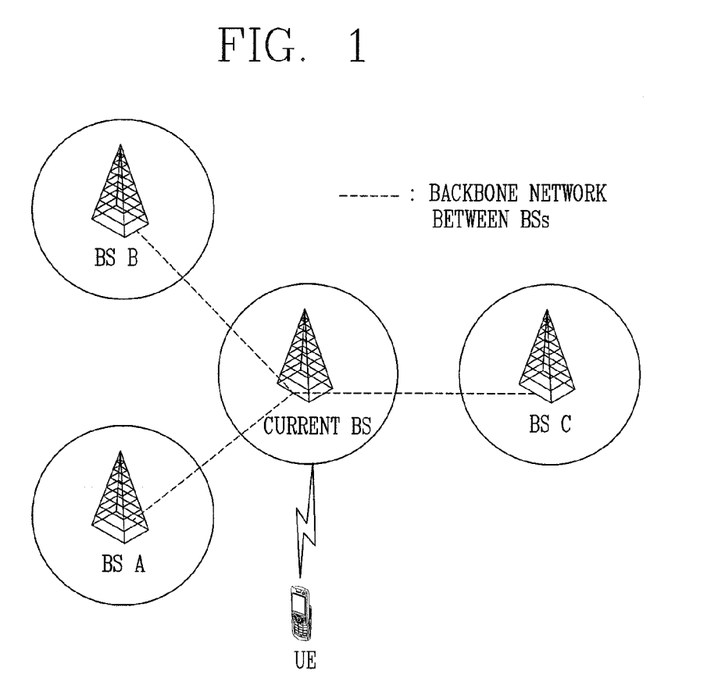
FIG. 1 is an exemplary view illustrating a TDOA wireless positioning method in a cellular mobile communication scheme.

FIG. 1 is an exemplary view illustrating a TDOA wireless positioning method in a cellular mobile communication system.

A wireless positioning method in a cellular mobile communication system may be implemented by periodically transmitting the location information of a currently accessed base station and neighbor base stations to all mobile terminals accessed on a base station, and measuring the location of a mobile terminal using a specific wireless positioning method such as Time Difference Of Arrival (TDOA) using the location information of such base stations.

For example, in case of an IEEE 802.16e wireless communication system, a currently accessed base station 200 collects information on base stations 200a, 200b, 200c adjacent to the base station itself via a backbone network of the base stations, and transfers the information to all mobile terminals 100 belonging to its own region in a broadcast form through an advertisement function. Using the foregoing function, a current base station may provide the latitude, longitude and altitude information of neighbor base stations 200a, 200b, 200c to mobile terminals existing in its own region. A mobile terminal can measure a signal intensity and a delay time from each neighbor base station by performing a scanning and association function on neighbor base stations, and thus they may be combined with the received location information of the relevant base stations to estimate its own location.

The format of a LBS-ADV message used in advertising the location information of a base station described in the foregoing example is shown in Table 1. The LBS-ADV message containing the unique identifier (BSID) and location information of a currently accessed base station 200 and neighbor base stations 200a, 200b, 200c is periodically transmitted.

TABLE 1

| Syntax | Size | Notes |
| --- | --- | --- |
| LBS-ADV_Message_Format() { | | LBS-ADV |
|   Management message type = 69 | | |

TABLE 1-continued

| Syntax | Size | Notes |
|---|---|---|
| Number_of_BS | 8 bits | Total number of serving BS and neighbor BSs |
| For (j = 0 ; j < Number_of_BS ; j++) { | | |
| Length | 8 bits | Length of message information within the iteration of Number_of_BS in bytes. |
| BSID | 24 bits | The least significant 24 bits of the Base Station ID parameter in the DL-MAP message of the Serving BS or Neighbor BS. |
| TLV encoded information } } | Variable | TLV specific |

The LBS-ADV message displays a location coordinate of the base station with latitude, longitude and altitude according to RFC3825. The latitude and longitude is a binary value of 34 bits in which the 25 bits thereof show a fractional value.

A positive and a negative value of the latitude represent north and south, respectively, and a positive and a negative value of the longitude represent east and west, respectively. In case of the altitude, a positive value and a negative value represent on the ground and under the ground, respectively.

The format of a base station coordinate representation in an IEEE 802.16e network is shown in Table 2.

TABLE 2

| Name | Length | Value |
|---|---|---|
| Longitude | 5 (40 bits) | Bits # 0-5: longitude resolution<br>1-34 - number of valid bits in fixed-point value of longitude value<br>35 - LBS not supported<br>Others - reserved<br>Bits # 6-14: longitude integer<br>Bits # 15-39: longitude fraction |
| Latitude | 5 (40 bits) | Bits # 0-5: latitude resolution<br>1-34 - number of valid bits in fixed-point value of latitude value<br>35 - LBS not supported<br>Others - reserved<br>Bits # 6-14: latitude integer<br>Bits # 15-39: latitude fraction |
| Altitude | 5 (40 bits) | Bits # 0-3: altitude type<br>1 - meters<br>2 - floors<br>Others - reserved<br>Bits #4-9: altitude resolution<br>1-30 - number of valid bits in fixed-point value of altitude value<br>31 - LBS not supported<br>Others - reserved<br>Bits # 10-31: altitude integer<br>Bits # 32-39: altitude fraction |

In order to measure the location of a mobile terminal in case of TDOA which is one of IEEE 802.16e wireless positioning schemes, signaling with at least three base stations containing a currently accessed base station is required, and thus the base station should transmit a LBS-ADV message having a size of minimum 50 bytes. It is the minimum value, and in general cases, the size of a LBS-ADV message may increase up to several hundred bytes.

Figure 2:
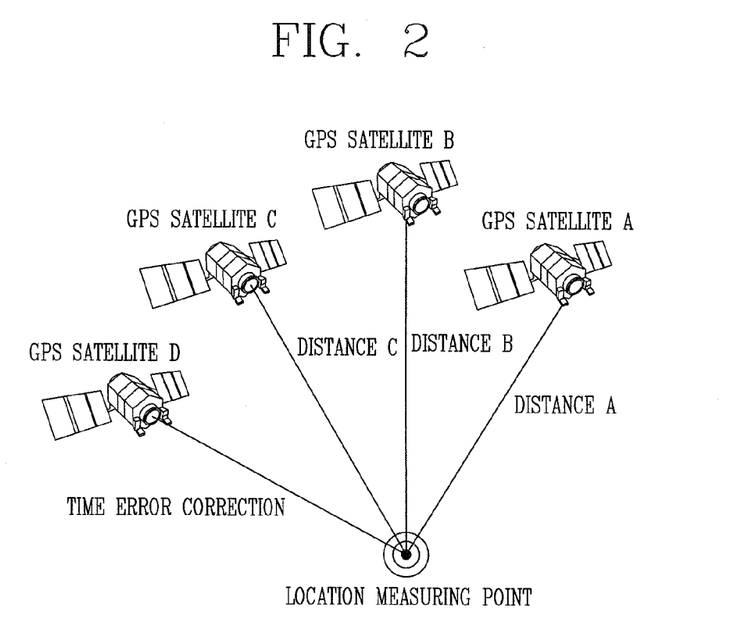
FIG. 2 is an exemplary view illustrating a wireless positioning method using GPS.

FIG. 2 is an exemplary view illustrating a wireless positioning method using GPS.

The foregoing method is a location measurement scheme for computing a distance between a GPS satellite and a GPS receiver to obtain a coordinate value, in which radio waves from at least three satellites are received to measure location. In general, an error may occur between a clock incorporated in the satellite and a clock incorporated in the receiver, and thus location measurement is carried out by using at least four satellites.

The location measurement scheme using GPS has an advantage capable of performing a high accuracy location measurement compared to the location measurement scheme using a wireless communication base station such as TDOA, but also has a drawback in which the power consumption is high and the reception of satellite signals is not easy indoors.

In order to solve the foregoing problem of the scheme, according to the present disclosure, there is proposed a scheme of allowing a specific terminal to measure its own location using GPS positioning or the like, and sharing the relevant location information with a neighbor terminal. Accordingly, the neighbor terminal may know its own location without directly performing a location measurement.

Meanwhile, the process of directly transmitting the location information of the relevant terminal to a neighbor terminal may likely provide unreliable location information, and thus there is also defined a method of receiving and using a temporary ID (TID) for sharing location information from a base station.

Finally, according to the present disclosure, there is proposed a method of using a personal area network (PAN) having a small wireless transmission coverage to transmit and receive a temporary identifier between neighbor terminals. It is because the location information of a specific terminal is also effective for a neighbor terminal.

The PAN technologies may include active RFID, Bluetooth, Zigbee, and the like.

An active RFID system is typically consisted of an active RFID tag and a RFID reader. Furthermore, the active RFID tag is incorporated with a battery and a transmitter therein to transmit data by itself. The active RFID tag having such a structure operates in a power save mode/sleep mode in a typical case to save the battery, and the RFID reader periodically transmits a wake-up signal to activate a RFID tag being operated in such a power save mode. A RFID reader may recognize a plurality of RFID tags, and transmit and/or receive data to and/or from the RFID tags using a half duplex scheme.

A representative international standard of the active RFID system is ISO 18000-7, and this standard is a single channel system having a channel band of 200 KHz at 433. 92 MHz. The data transmission rate provided by the system is about 27.778 kbps.

Bluetooth is a near field wireless networking technology developed by a special interest group (SIG) organized by Ericsson, Nokia, IBM, Intel, Toshiba, and the like, in 1998. The technology allows a LAN configuration in a mobile phone terminal, requires a small power consumption when transmitting data, and effectively uses a frequency band, and thus has been rapidly spread in the market.

Bluetooth using the standard IEEE 802.15.1 is one of personal area networks (PANs), which uses the industrial, scientific and medical (ISM) band at 2.45 GHz. The support speed is 723.1 kbps in case of version 1.1 and 1.2, and an enhanced data rate is characterized in case of version 2.0 to allow the speed at 2.1 Mbps. The key feature of Bluetooth 3.0 announced in 2009 is an enhanced speed at maximum 24 Mbps by employing IEEE 802.11 Protocol Adaptation Layer (PAL). One of advantages of the Bluetooth scheme is low power consumption, and the consumption power of Bluetooth 1.0 is less than 100 mW at voltage 2.7 V.

Zigbee is a wireless technology standard based on IEEE 802.15.4 (PHY, MAC), in which an upper level of communication regulation is prescribed based on the standard IEEE 802.15.4. Zigbee is designed to use IEEE 802.15.4 low power digital radio for a wireless personal area network (WPAN) such as a wireless headphone or the like. Contrary to other wireless personal area networks (WPANs) such as Bluetooth or the like, Zigbee is a relatively low cost and simple technology. Zigbee is adapted to networking with a low data transmission rate, a low power consumption amount, security, and the like. The data transmission coverage is 10-75 m, and the average consumption current is about 10 μA.

Figure 3:
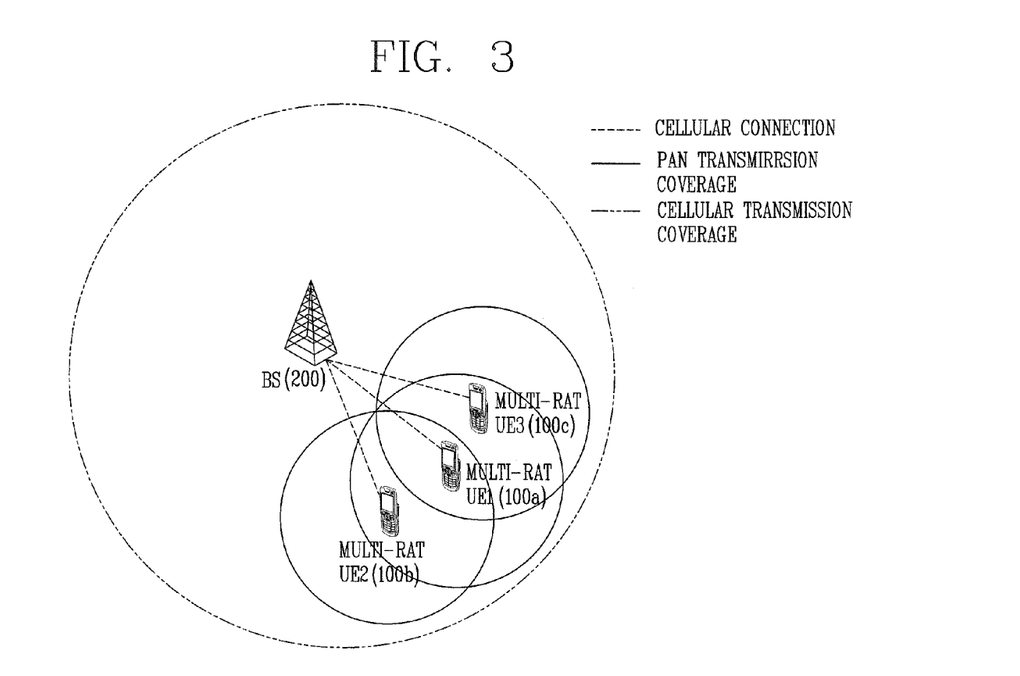
FIG. 3 is an exemplary view illustrating a wireless connection environment for sharing the location information of a neighbor terminal.

FIG. 3 is an exemplary view illustrating a wireless connection environment for sharing the location information of a neighbor terminal.

Terminals in the drawing represent multiple radio access technology (multi-RAT) terminals capable of supporting a wireless communication function with a cellular scheme and a near field wireless communication function with a personal area network (PAN) scheme. If a terminal 100a measures its own location using a specific location measurement scheme, then its own location information is reported to the base station 200 using a cellular communication scheme. Furthermore, a temporary identifier (TID) is transmitted to neighbor terminals 100b, 100c by using a PAN scheme. The neighbor terminals 100b, 100c are allowed to know that the terminal 100a having the relevant temporary identifier exists within a communication available range. A mobile terminal 100b or 100c required to perform location measurement among the neighbor terminals requests the location information of the terminal 100a having the temporary identifier to the base station, and receives the location information of the terminal 100a from the base station.

In this case, the mobile terminals 100a, 100b, 100c maintain a cellular connection with the base station 200, and use PAN communication when information such as a temporary identifier is required to be transferred between mobile terminals.

The wireless transmission and reception in a PAN scheme has an advantage of providing very low power consumption. Accordingly, it is advantageous in the aspect of power consumption compared to the process of directly measuring the location of the mobile terminal using a GPS scheme. Furthermore, it may be possible to acquire location information corresponding to a GPS scheme even when a GPS receiver is not mounted in a mobile terminal.

Figure 4:
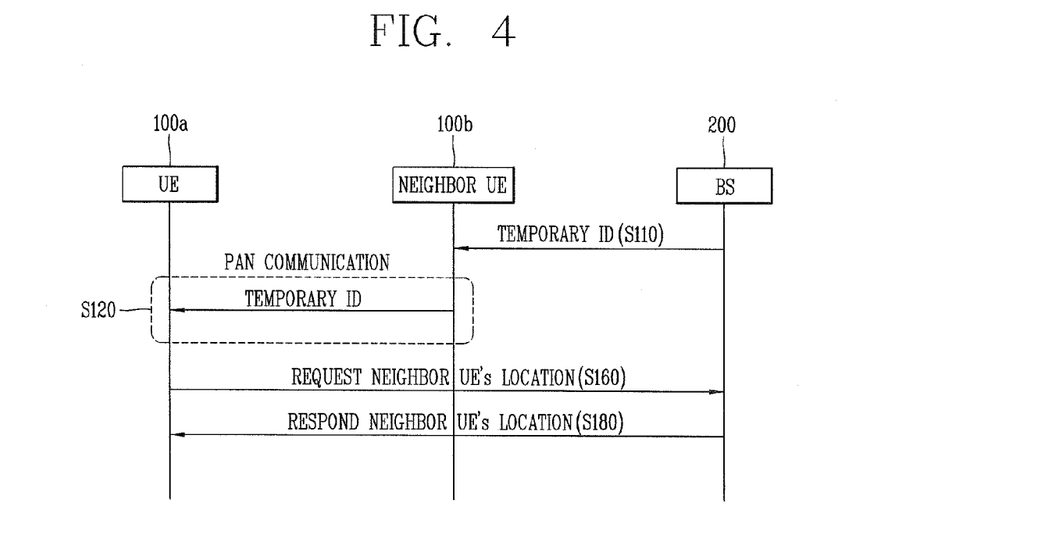
FIG. 4 is a flow chart illustrating a method of using the location information of a neighbor terminal according to an embodiment of the present invention.

FIG. 4 is a flow chart illustrating a method of using the location information of a neighbor terminal according to an embodiment of the present invention.

For the sake of brevity of explanation, it is assumed that two terminals 100a, 100b are located within the coverage of the base station 200.

The base station can grant a temporary identifier to a mobile terminal 100b located within the coverage (S110).

The mobile terminal 100b can transmit its own temporary identifier to a neighbor terminal 100a using a PAN scheme (S120). The temporary identifier is information indicating that the location information of a terminal can be shared with other terminals. In this case, data transmission in a PAN scheme may be an active RFID scheme, a Zigbee scheme, or Bluetooth scheme. The active RFID scheme may have instantaneousness in which data is transmitted for a short instant and then the connection is disconnected.

When a Zigbee or Bluetooth scheme is used, the temporary identifier may be included and transferred through a beacon message used to transmit system information. Otherwise, a temporary identifier may be transferred by using a message containing the temporary identifier after they are mutually accessed at a predetermined time.

The terminal 100a that requires location information may request to the base station 200 the location information of the terminal 100b that has transmitted the temporary identifier (S160).

In this case, the terminal 100a requesting location information may examine whether or not an effective time period of the temporary identifier has been passed. If a predetermined period of time has been passed, then the location information of a neighbor terminal is likely not effective any more because the terminal 100a requesting location information has been moved. The effective time period of the temporary identifier may be a fixed value, or may be determined differently for each base station. Furthermore, the effective time period may be concurrently transmitted when a temporary identifier is granted by the base station. The effective time period may be received together with a temporary identifier from the neighbor terminal 100b.

The base station may transmit the location information of the neighbor terminal 100b to the terminal 100a requesting the location information when the base station has location information transmitted by the terminal 100b granted with a temporary identifier (S180).

During the process, the terminal 100a trying to perform location measurement can use the location of the neighbor terminal 100b because the PAN transmission coverage used to transmit a temporary identifier is small, comparable to an error range of GPS.

If the base station 200 does not have the location information of the terminal 100b granted with a temporary identifier, then the base station 200 may notify the terminal 100a requesting the location information that there is no location information. Upon receiving a notification indicating that there is no location information for a neighbor terminal from the base station 200, the terminal 100a requesting the location information may measure its own location using a GPS scheme or mobile communication system based scheme.

Figure 5:
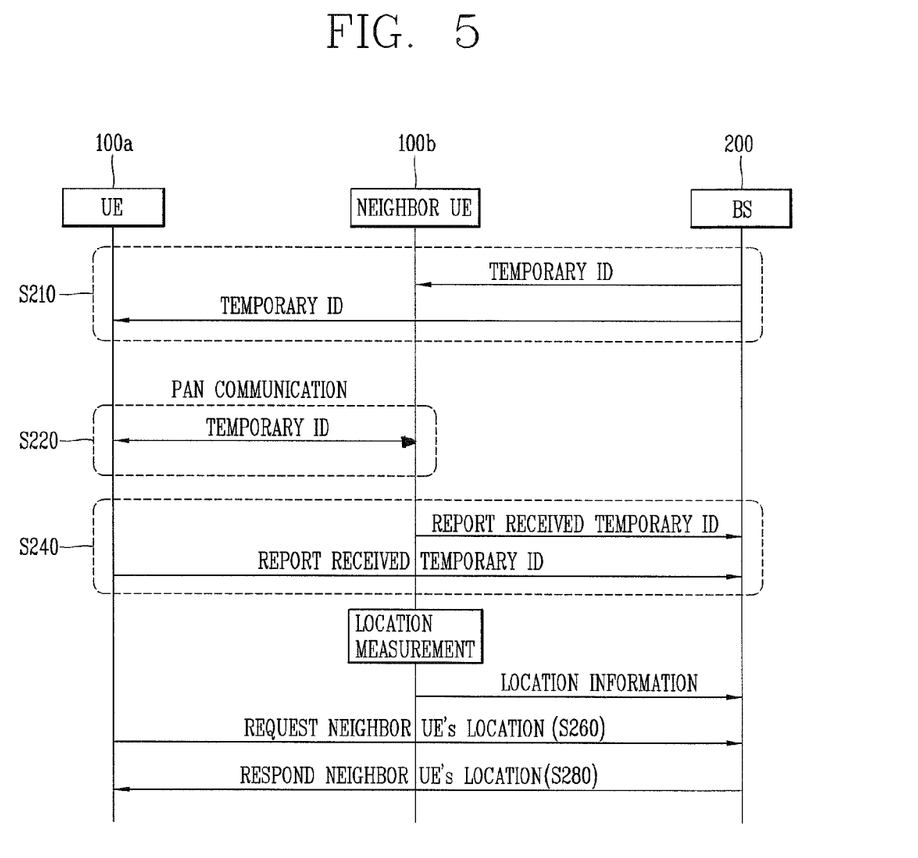
FIG. 5 is a flow chart illustrating a method of using the location information of a neighbor terminal according to another embodiment of the present invention.

FIG. 5 is a flow chart illustrating a method of using the location information of a neighbor terminal according to another embodiment of the present invention.

The base station 200 may grant a temporary identifier to terminals 100a, 100b being accessed (S210). In this case, the temporary identifier may be granted by determining a specific time or granted to the relevant terminal when a terminal initially accesses the base station 200.

Furthermore, the base station 200 may concurrently notify the time for allowing terminals to transfer a temporary identifier to one another using a specific PAN scheme.

The terminals 100a, 100b granted with a temporary identifier may transmit the temporary identifier to a neighbor terminal using a PAN scheme (S220). In this case, the method of transmitting a temporary identifier has been described in FIG. 4.

Each terminal that has received a temporary identifier from the neighbor terminal reports the temporary identifier of the neighbor terminal to the base station 200 (S240). The base station 200 that has received a temporary identifier from each terminal may know that each terminal is located adjacent to which one.

The terminal 100a trying to measure its own location among the terminals may request the location information of the neighbor terminal 100b to the base station 200 (S260).

In this case, the terminal 100a requesting location information may examine whether or not an effective time period of the temporary identifier has been passed. If a predetermined period of time has been passed, then the location information of a neighbor terminal is likely not effective any more because the terminal 100a requesting location information has been moved. The effective time period of the temporary identifier may be a fixed value, or may be determined differently for each base station. Furthermore, the effective time period may be concurrently transmitted when a temporary identifier is granted by the base station.

If the base station 200 knows the location of a terminal adjacent to the relevant terminal 100a, the base station 200 may transmit the location information to the terminal 100a (S280).

If there is no neighbor terminal for which the location is known to the base station 200, the base station 200 notifies to the terminal 100a that there is no location information for neighbor terminals. The terminal 100a that has received a notification that there is no location information for neighbor terminals from the base station 200 may perform a measurement for its own location, and then transmit its own measured location information to the base station.

Figure 6:
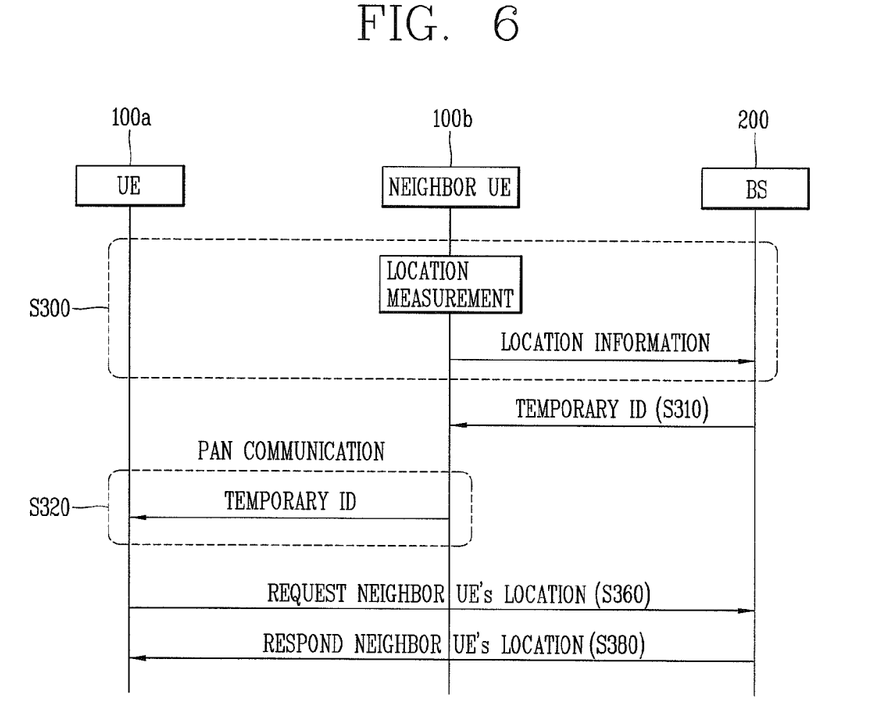
FIG. 6 is a flow chart illustrating a method of using the location information of a neighbor terminal according to still another embodiment of the present invention.

FIG. 6 is a flow chart illustrating a method of using the location information of a neighbor terminal according to still another embodiment of the present invention.

The terminal 100b may perform a measurement for its own location, and then report its own location information to the base station 200 (S300).

The base station 200 that has received location information from the terminal 100b may grant a temporary identifier to the terminal 100b that has reported the location information (S310).

The terminal 100b granted with a temporary identifier may transmit the temporary identifier to a neighbor terminal using a PAN scheme (S320). In this case, the method of transmitting a temporary identifier has been described in FIG. 4.

The terminal 100a that requires location information may request the location information of the terminal 100b that has transmitted the temporary identifier to the base station 200 (S360).

In this case, the terminal 100a requesting location information may examine whether or not an effective time period of the temporary identifier has been passed. If a predetermined period of time has been passed, then the location information of a neighbor terminal is likely not effective any more because the terminal 100a requesting location information has been moved. The effective time period of the temporary identifier may be a fixed value, or may be determined differently for each base station. Furthermore, the effective time period may be concurrently transmitted when a temporary identifier is granted by the base station.

The base station 200 may transmit the location information of the neighbor terminal 100b to the terminal 100a requesting the location information when the base station has location information transmitted by the terminal 100b granted with a temporary identifier (S380).

If the base station 200 does not have the location information of the terminal 100b granted with a temporary identifier, then the base station 200 may notify the terminal 100a requesting the location information that there is no location information. Upon receiving a notification indicating that there is no location information for a neighbor terminal from the base station 200, the terminal 100a requesting the location information may measure its own location using a GPS scheme or mobile communication system based scheme.

Figure 7:
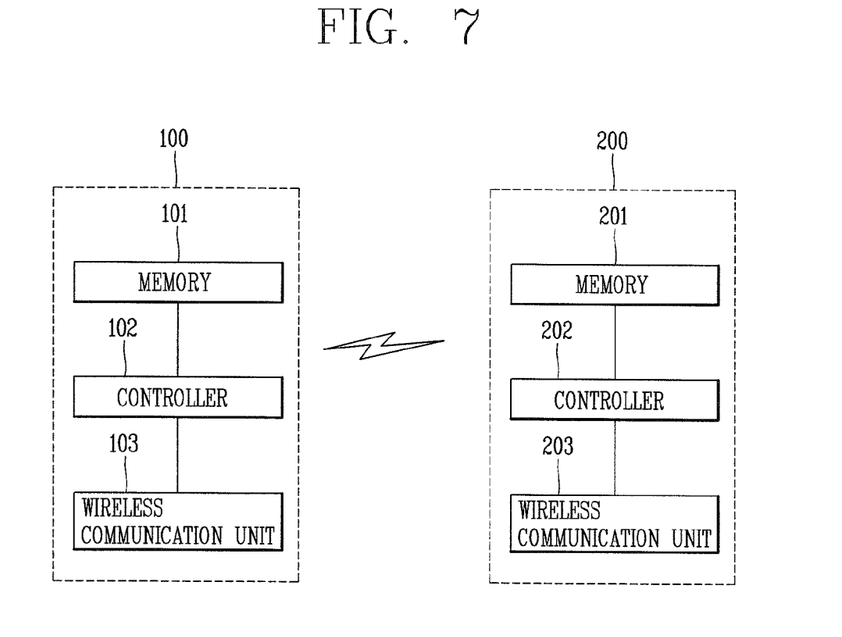
FIG. 7 is a block diagram illustrating the elements of a mobile terminal and a base station.

FIG. 7 is a block diagram illustrating the elements of a mobile terminal and a base station.

The terminal 100 may include a controller 102, a memory 101, and a wireless communication unit 103.

Furthermore, the terminal may further include a display unit, a user interface unit, and the like.

The controller 102 may implement the proposed function, process and/or method. The layers of a wireless interface protocol may be implemented by the controller 102.

The controller 102 may control the wireless communication unit 103 to receive a temporary identifier and information associated with the temporary identifier from the base station. Furthermore, the controller 102 may control the wireless communication unit to receive the location information of a neighbor terminal from the base station.

The controller 102 may control the wireless communication unit to transmit and/or receive a temporary identifier and information associated with the temporary identifier to and/or from a neighbor terminal using a PAN technology.

The controller 102 may examine whether or not an effective time of the temporary identifier has been passed.

The controller 102 may control the wireless communication unit 103 to transmit a location information request of the neighbor terminal to the base station.

The memory 101 may be connected to the controller 102 to store a protocol or parameter for performing wireless communication. In other words, a terminal driving system, applications and general files can be stored therein. Furthermore, a temporary identifier and information associated with the temporary identifier can be stored therein.

The wireless communication unit 103 may be connected to the controller 102 to transmit and receive radio signals in a cellular mobile communication scheme and/or PAN scheme.

In addition, the display unit may display various information of the terminal and use a well-known element such as a liquid crystal display (LCD), organic light emitting diodes (OLEDs), and the like. The user interface unit may be implemented by combining well-known user interfaces such as a keypad, a touch screen or the like.

The base station 200 may include a controller 202, a memory 201, and a wireless communication unit 203.

The controller 202 may implement the proposed function, process and/or method. The layers of a wireless interface protocol may be implemented by the controller 202.

The controller 202 may set a temporary identifier and information associated with the temporary identifier for each terminal. The controller 202 may control the wireless communication unit 203 to transmit the temporary identifier and its related information to the terminal.

The controller 202 may control the wireless communication unit 203 to receive the location information of a terminal that has been measured and transmitted by the relevant terminal. Furthermore, the controller 202 may manage the location information of each terminal.

The controller 202 may control the wireless communication unit 203 to receive a location information request of a neighbor terminal transmitted by the terminal. In this case, the controller 202 may control the wireless communication unit 203 to transmit a location information request of the neighbor terminal that has been managed. Alternatively, the controller 202 may control the wireless communication unit 203 to transmit a notification for indicating that there is no location information for the neighbor terminal.

The memory 201 may be connected to the controller 202 to store a protocol or parameter for performing wireless communication. Furthermore, a temporary identifier, location information, and the like for each terminal can be stored therein.

The wireless communication unit 203 may be connected to the controller 202 to transmit or receive radio signals.

The controller 102, 202 may include an application-specific integrated circuit (ASIC), other chipsets, a logic circuit and/or a data processing device. The memory 101, 201 may include a read-only memory (ROM), a random access memory (RAM), a flash memory, a memory card, a storage medium and/or other storage devices. The wireless communication unit 103, 203 may include a baseband circuit for processing radio signals. When the embodiment is implemented by software, the foregoing technique may be implemented by a module (process, function, etc.) for performing the foregoing function. The module may be stored in the memory 101, 201 and implemented by the controller 102, 202.

The memory 101, 201 may be located within or out of the controller 102, 202, and may be connected to the controller 102, 202 through various well-known means.

Various embodiments described herein may be implemented in a medium that can be read by a computer or similar device using software, hardware, or any combination thereof.

In the above-mentioned embodiments, the constituent elements and features of the present disclosure are combined with one another in a predetermined form. Each constituent element or feature thereof should be considered to be selective as unless otherwise particularly specified. Each constituent element or feature thereof may be implemented in a form that is not combined with any other constituent elements or features. Furthermore, an embodiment of the present disclosure may be also configured by combining some of the constituent elements and/or features. The sequence of the operations described in the embodiments of the present disclosure may be changed. Some of the configurations or features of any embodiment may be included in any other embodiments, or may be replaced with the configurations and features corresponding to the any other embodiments. In addition, it will be apparent that an embodiment may be configured by a combination of claims cited by each other and a new claim may be included by the amendment after filing the application.

Embodiments of the present disclosure are described mainly in relation to the transmission and reception of data between a base station and a mobile station.

Here, the base station functions as a terminal node of a network, which directly performs communication with the terminal. In this document, a specific operation or processing described to be performed by a base station may be carried out by an upper node of the base station if necessary.

In this case, the term "base station" may be replaced by a term such as fixed station, Node B, eNode B, access point, or the like. Furthermore, the term "terminal" may be replaced by a term such as mobile station (MS), subscriber station (SS), mobile subscriber station (MSS), or the like.

The present invention may be embodied in other specific forms without departing from the concept and essential characteristics thereof. The detailed description is, therefore, not to be construed as illustrative in all respects but considered as restrictive. The scope of the invention should be determined by reasonable interpretation of the appended claims and all changes that come within the equivalent scope of the invention are included in the scope of the invention. In addition, it will be apparent that an embodiment may be configured by a combination of claims cited by each other and a new claim may be included by the amendment after filing the application.

What is claimed is:

1. A method of allowing a mobile terminal to measure its own location through location information of a neighbor mobile terminal, the method comprising:
   receiving a temporary identifier of the neighbor mobile terminal and an effective time of the temporary identifier from the neighbor mobile terminal using near field wireless communication;
   transmitting a location information request to a base station using the temporary identifier if the effective time is remaining; and
   receiving the location information of the neighbor mobile terminal from the base station,
   wherein the received temporary identifier of the neighbor mobile terminal indicates that the mobile terminal is allowed to determine the location of the mobile terminal by using the location information of the neighbor mobile terminal adjacent to the mobile terminal, and is assigned from the base station before the temporary identifier is transmitted to the mobile terminal,
   wherein the location information of the neighbor mobile terminal is measured by the neighbor mobile terminal and is reported to the base station before the temporary identifier has been assigned to the neighbor mobile terminal, and
   wherein the effective time indicates a valid period for requesting the location information of the neighbor mobile terminal by using the temporary identifier.

2. The method of claim 1, wherein the reception of the temporary identifier using near field wireless communication uses an active RFID scheme.

3. The method of claim 1, wherein the reception of the temporary identifier using near field wireless communication uses either a Bluetooth scheme or a Zigbee scheme.

4. The method of claim 3, wherein the reception of the temporary identifier is implemented through a beacon message transmitted from the neighbor mobile terminal.

5. The method of claim 3, wherein the reception of the temporary identifier is implemented by accessing the neighbor mobile terminal at a preset time to receive a message containing the temporary identifier.

6. The method of claim 1, further comprising:
   examining the effective time of the temporary identifier prior to transmitting the location information request to the base station.

7. The method of claim 1, further comprising:
   receiving a temporary identifier from the base station;
   transmitting the temporary identifier received from the base station to a neighbor mobile terminal using near field wireless communication; and
   transmitting the temporary identifier of the neighbor mobile terminal received from the neighbor mobile terminal to the base station.

8. The method of claim 7, wherein receiving the temporary identifier from the base station is implemented by determining a specific time.

9. The method of claim 7, wherein receiving the temporary identifier from the base station is implemented when the mobile terminal initially accesses the base station.

10. The method of claim 7, wherein a time for transmitting the temporary identifier to the neighbor mobile terminal is concurrently received by using a specific near field wireless communication scheme when receiving the temporary identifier from the base station.

11. The method of claim 1, wherein the temporary identifier is received from the base station after the neighbor mobile terminal transmits its own location information to the base station.

12. A mobile terminal, comprising:
a wireless communication unit; and
a controller configured to control the wireless communication unit to transmit and/or receive a temporary identifier of a neighbor mobile terminal and an effective time of the temporary identifier to and/or from a neighbor mobile terminal, request location information of the neighbor mobile terminal having the temporary identifier from a base station if the effective time is remaining, and receive the location information of the neighbor mobile terminal from the base station,
wherein the received temporary identifier of the neighbor mobile terminal indicates that the mobile terminal is allowed to determine a location of the mobile terminal by using the location information of the neighbor mobile terminal adjacent to the mobile terminal, and is assigned from the base station before the temporary identifier is transmitted to the mobile terminal,
wherein the location information of the neighbor mobile terminal is measured by the neighbor mobile terminal and is reported to the base station before the temporary identifier has been assigned to the neighbor mobile terminal, and
wherein the effective time indicates a valid period for requesting the location information of the neighbor mobile terminal by using the temporary identifier, and
wherein the transmission and reception of the temporary identifier is implemented through near field wireless communication.

13. The mobile terminal of claim 12, wherein the near field wireless communication is an active RFID scheme, a Bluetooth scheme, or a Zigbee scheme.

* * * * *